Feb. 24, 1953　　　　　D. G. REMPEL　　　　　2,629,130
APPARATUS FOR PRODUCING ARTICLES AS BY COMPOUND
ROTATION OF ARTICLE-FORMING MEANS
Filed May 8, 1950　　　　　　　　　　　10 Sheets-Sheet 6
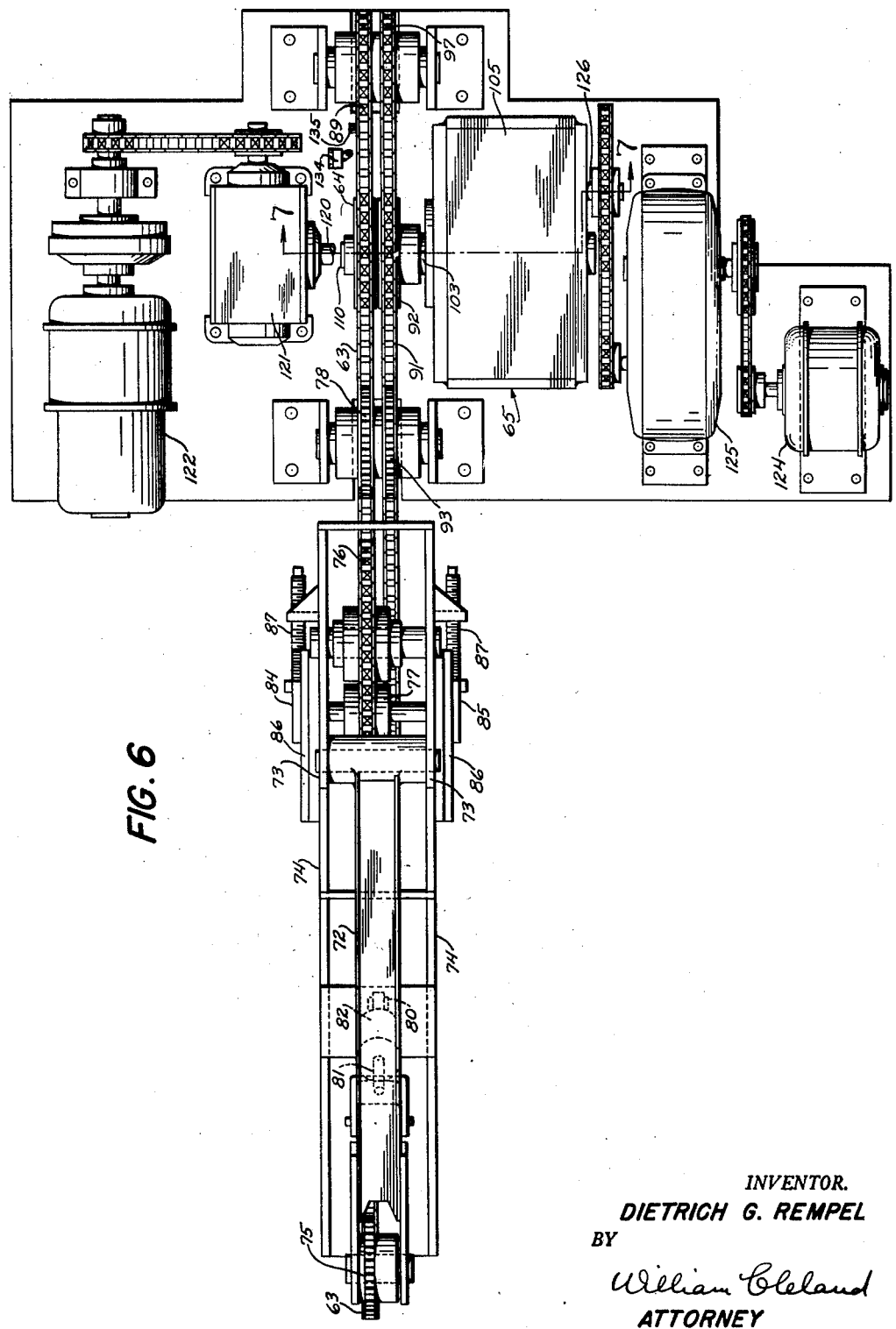
INVENTOR.
DIETRICH G. REMPEL
BY
William Cleland
ATTORNEY

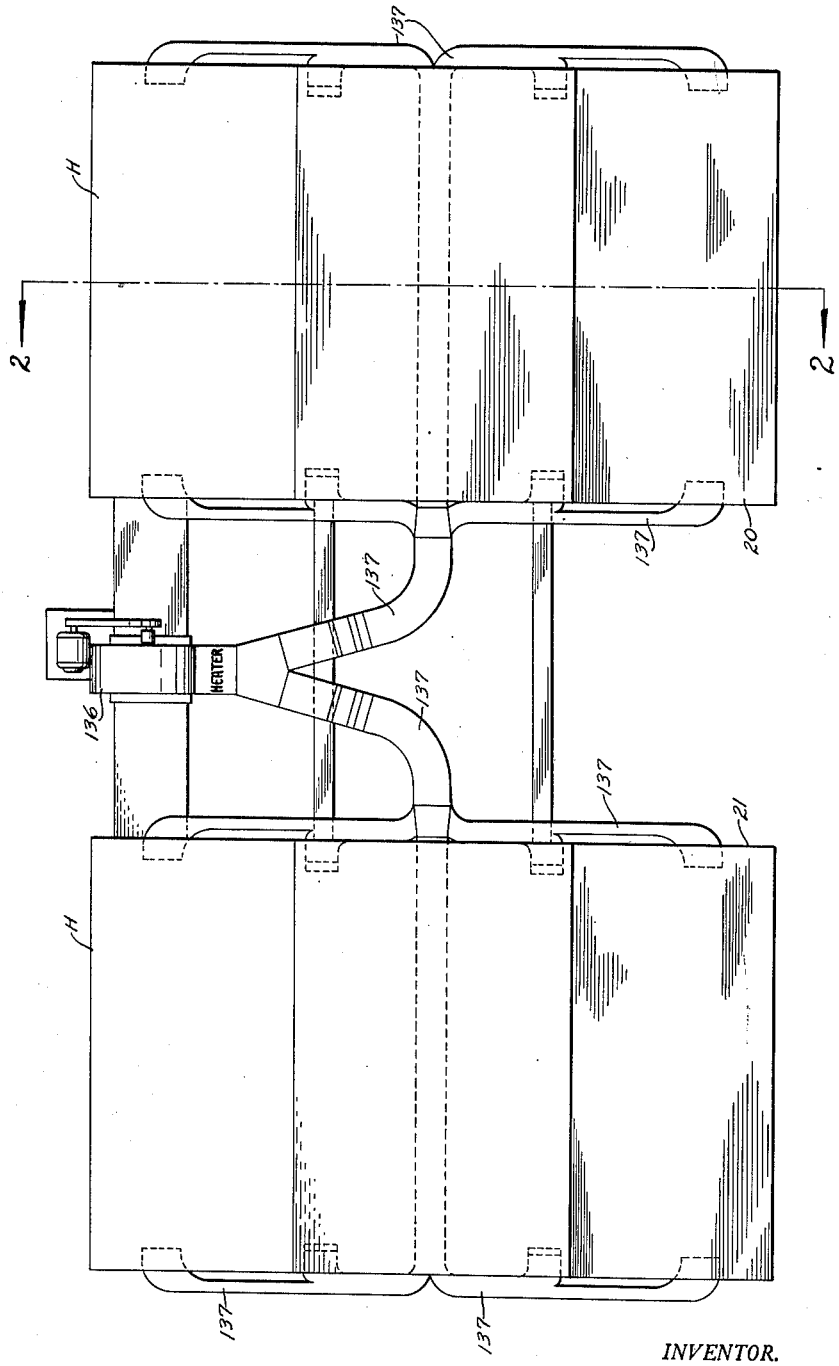

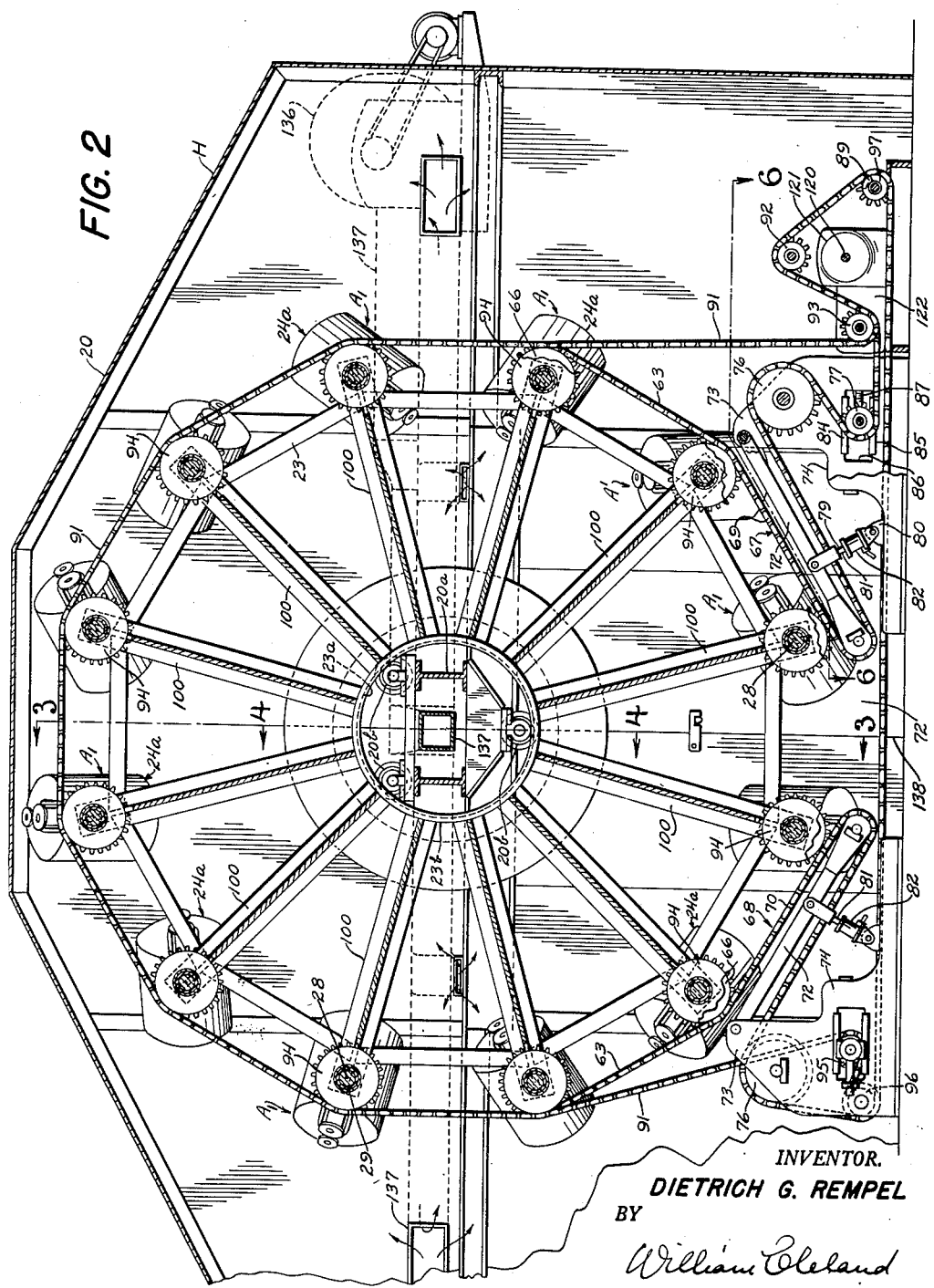

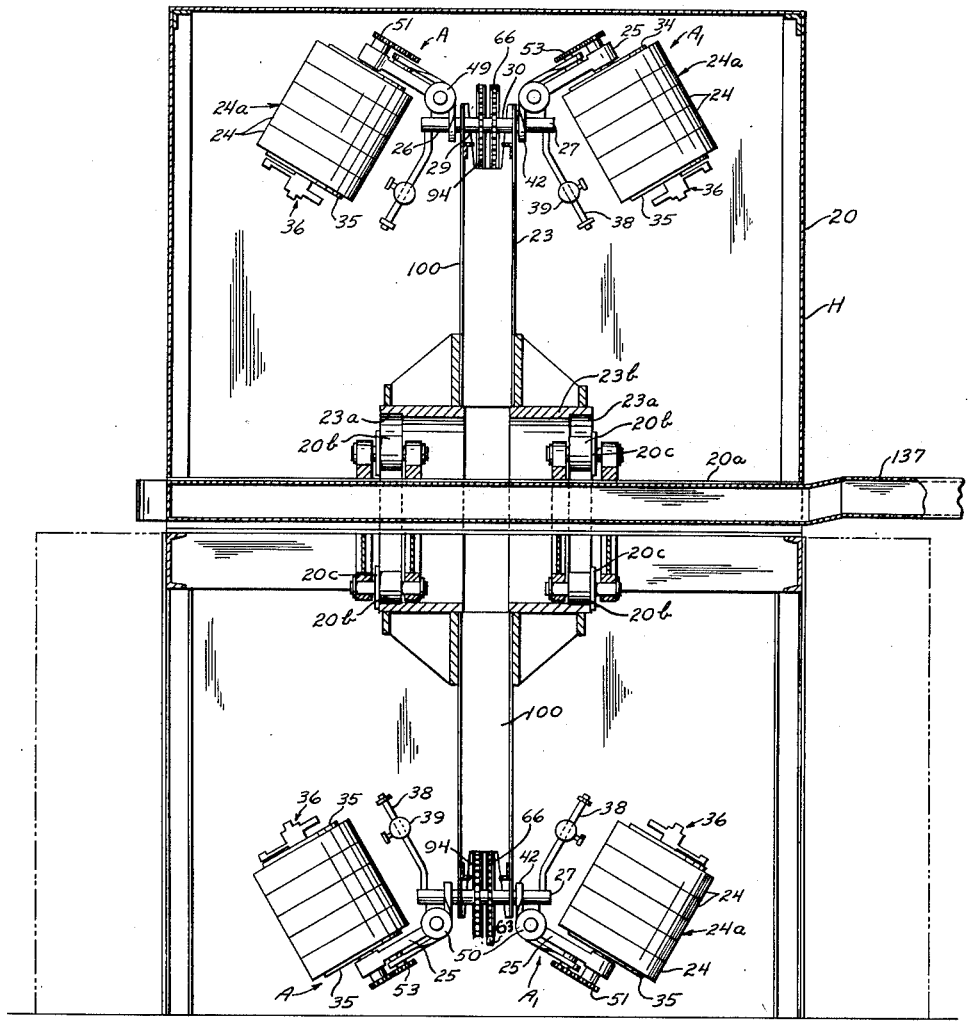

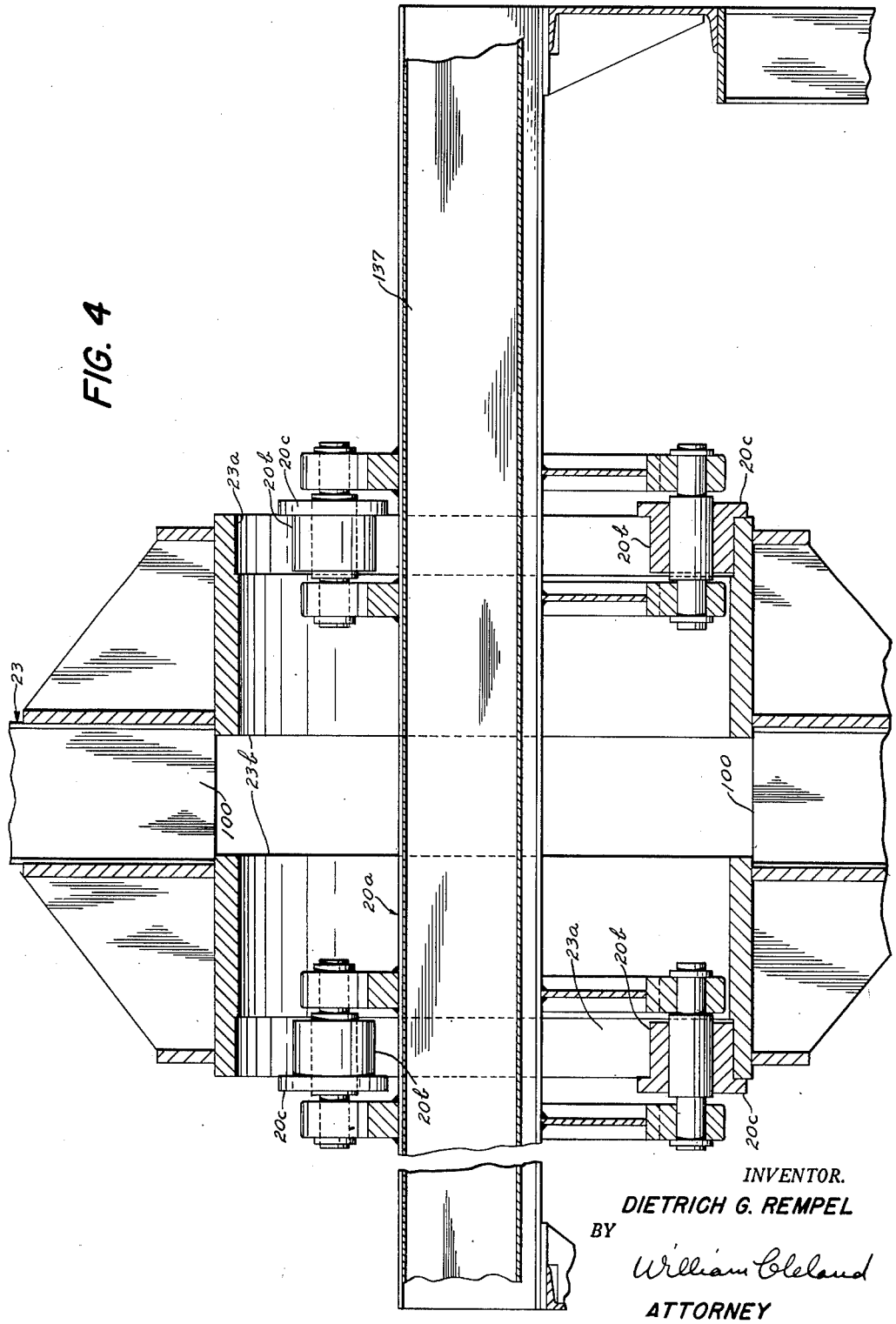

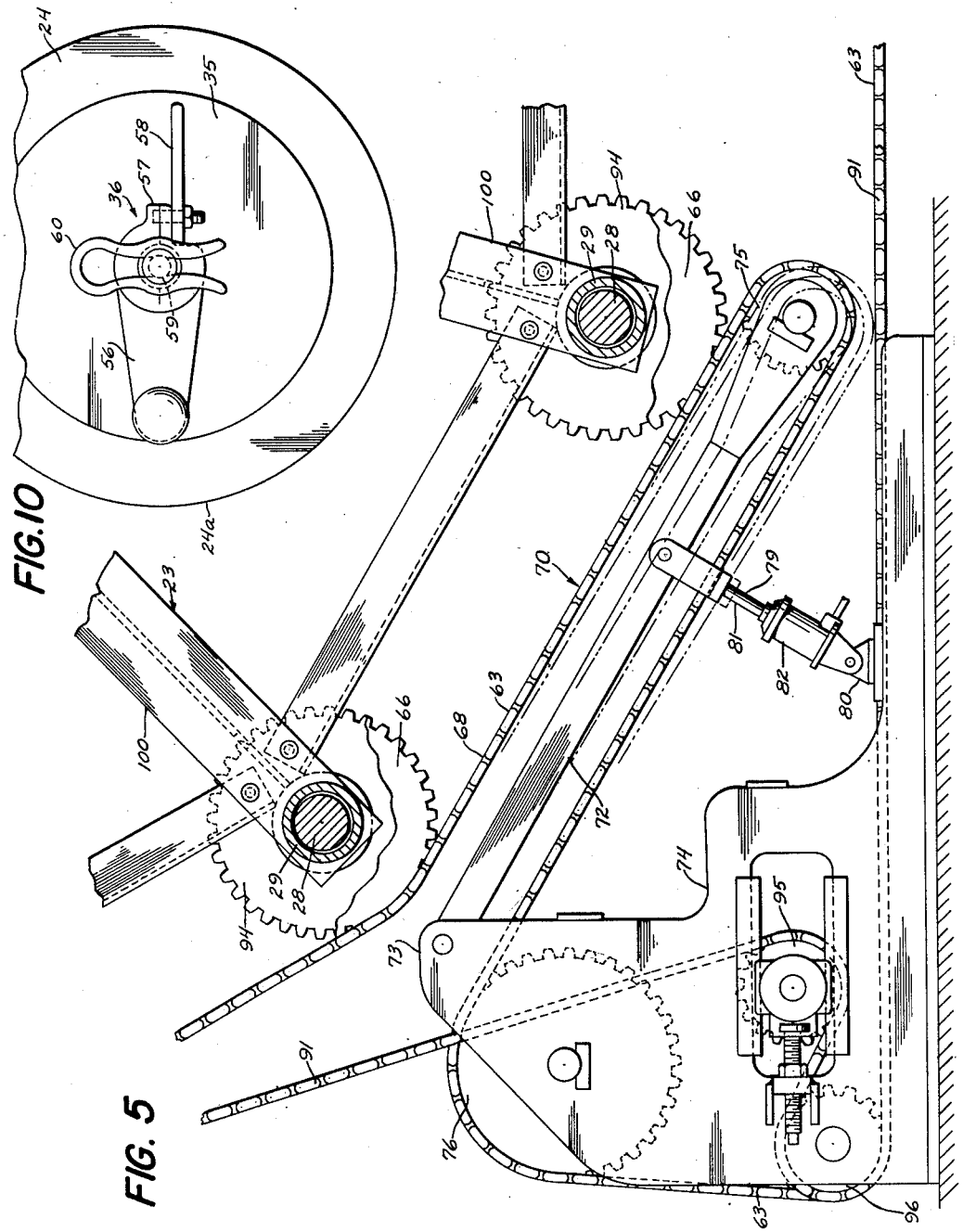

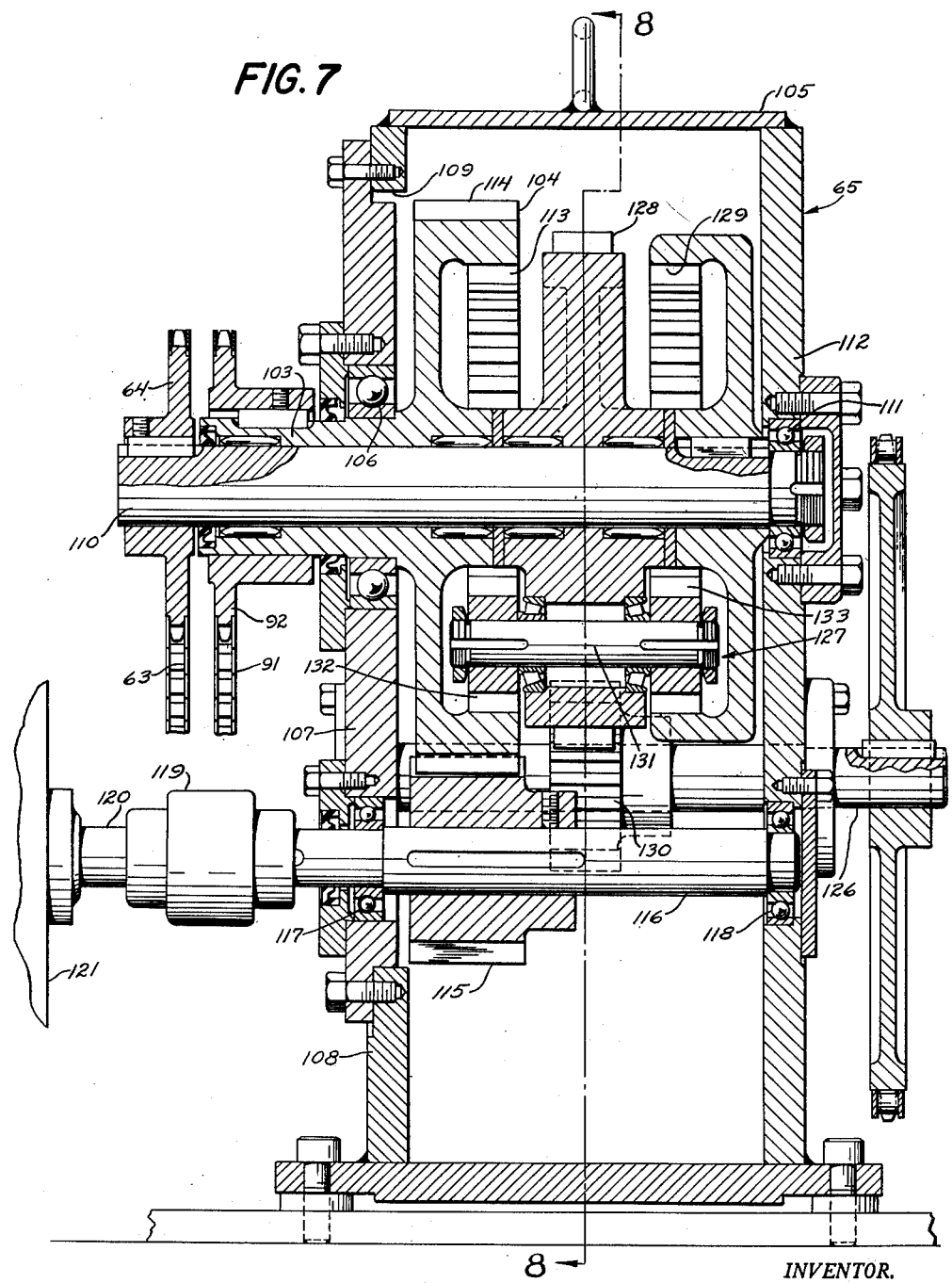

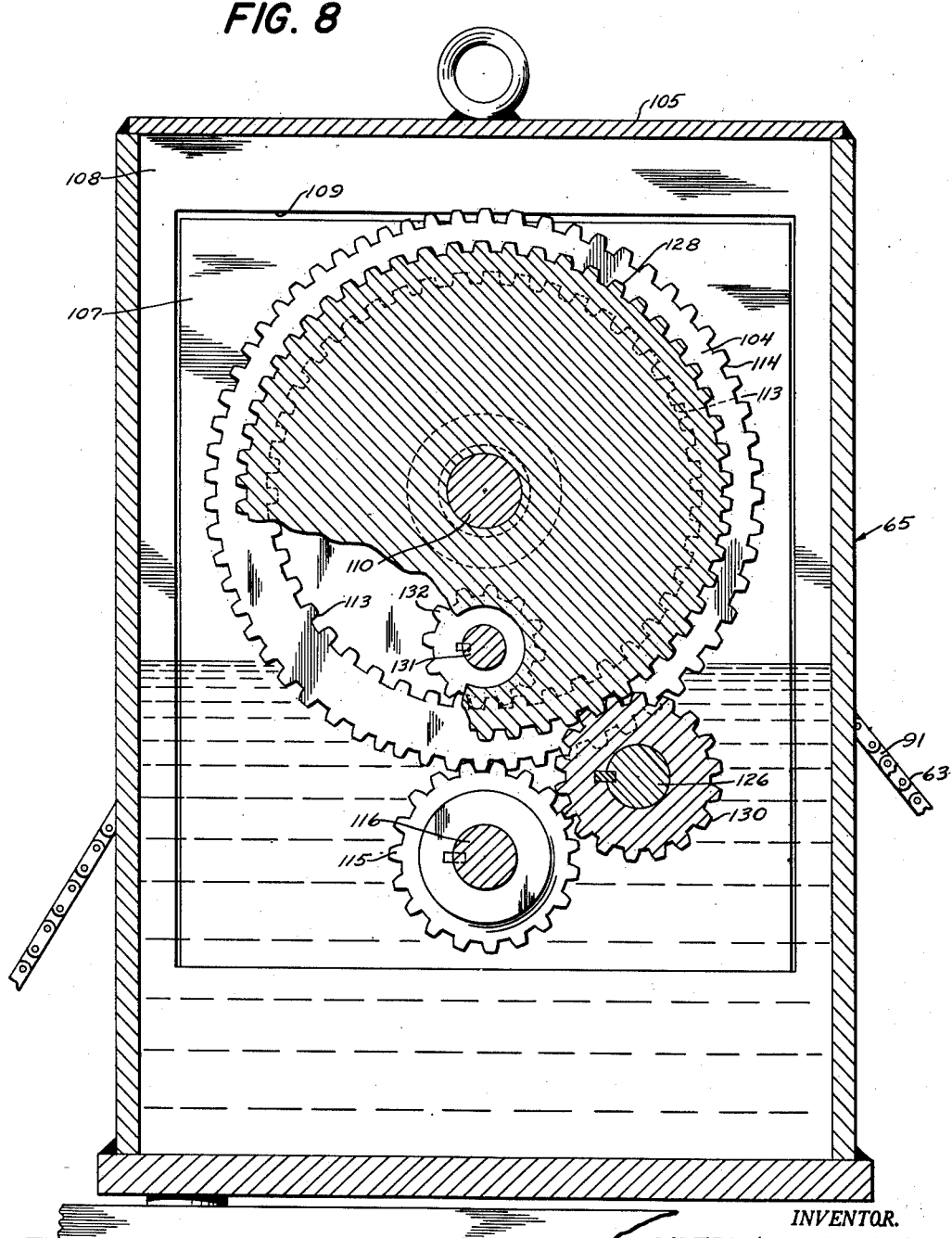

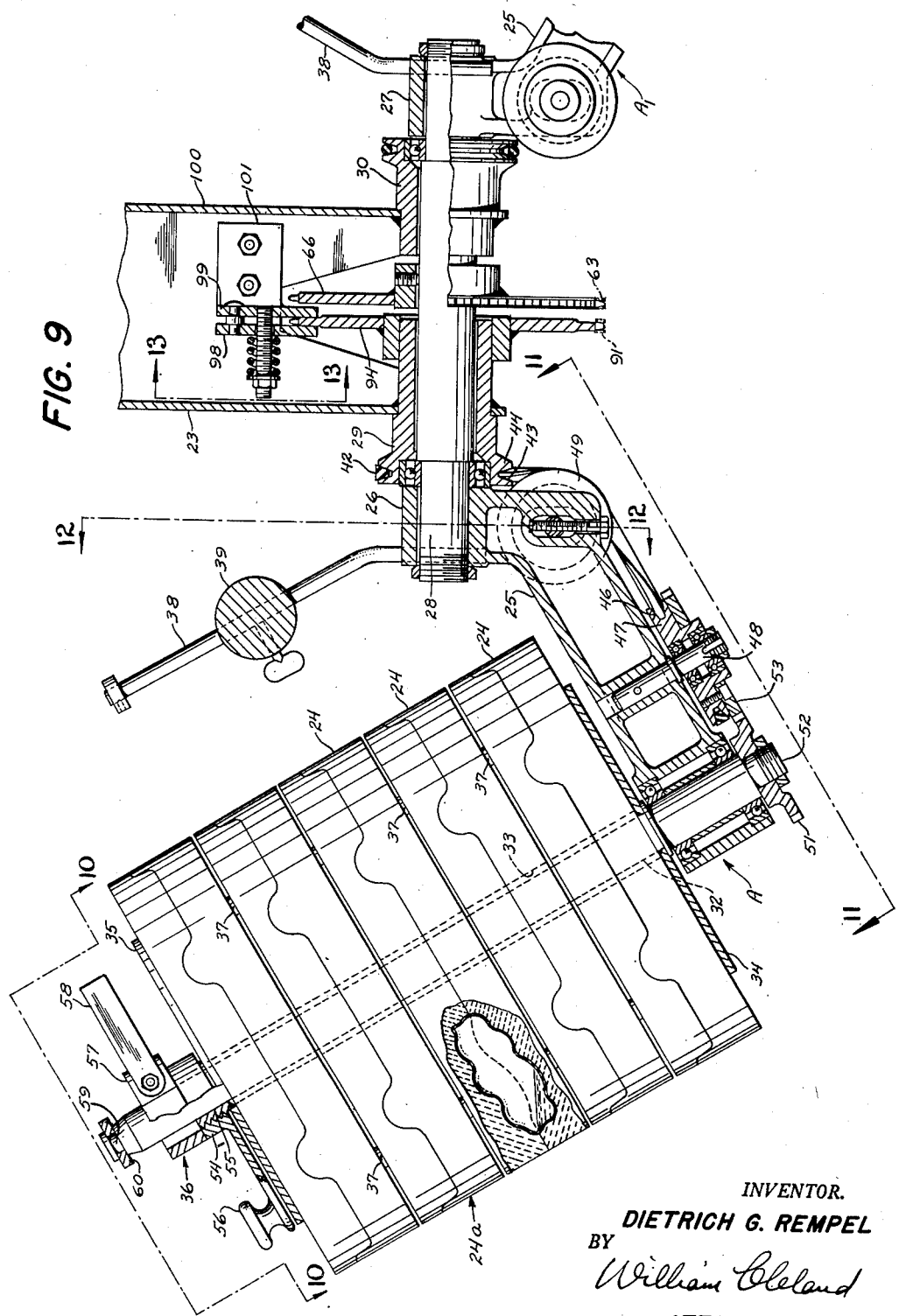

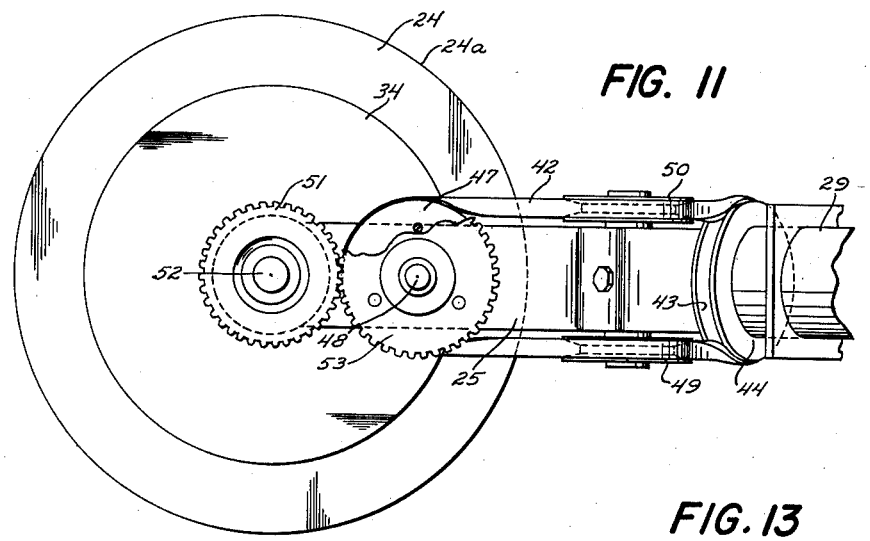
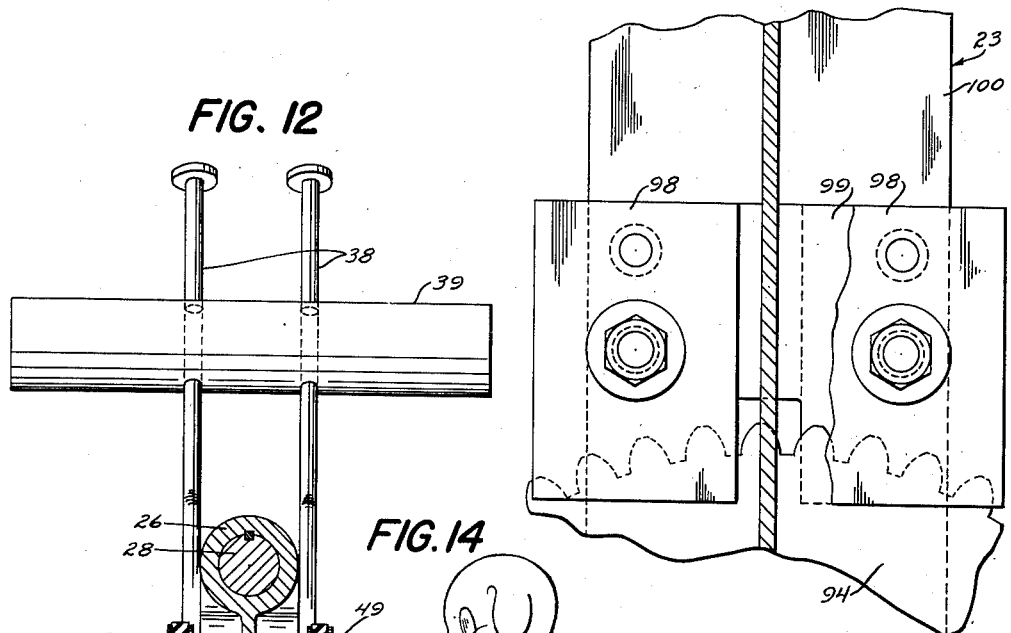
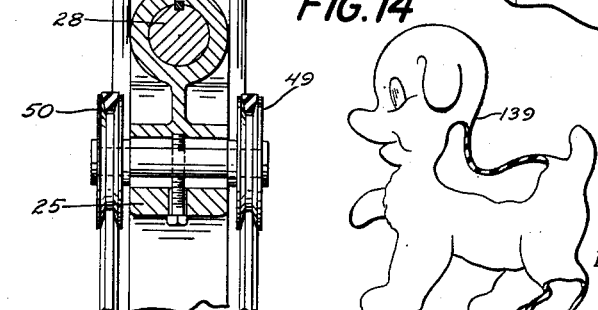

Patented Feb. 24, 1953

2,629,130

UNITED STATES PATENT OFFICE 2,629,130

APPARATUS FOR PRODUCING ARTICLES AS BY COMPOUND ROTATION OF ARTICLE-FORMING MEANS

Dietrich G. Rempel, Akron, Ohio, assignor to Rempel Manufacturing, Inc., Akron, Ohio, a corporation of Ohio Application May 8, 1950, Serial No. 160,792

18 Claims. (Cl. 18—26)

1

This invention relates to an improvement in apparatus for producing articles as by compound rotation of article-forming means.

This application is a continuation in part of application Serial No. 134,512, filed December 22, 1949.

The apparatus of the present invention is particularly adaptable for use in the rotary-casting process disclosed in Patent No. 2,469,892, issued May 10, 1949, wherein a plaster of Paris cavity mold containing a predetermined quantity of latex, or similar aqueous dispersion, is rotated about a plurality of angularly disposed axes, to deposit the latex on the mold cavity surface portions, aided by capillary flow of water from the latex outwardly through the mold pores.

A general object of this invention is to provide a single machine for continuously and uninterruptedly carrying out said rotary-casting process with a minimum of handling steps, particularly including the article-forming steps in the plaster mold and substantially complete removal of all water from the article-forming material.

Another object of the invention is to provide a machine of the character described which requires only a relatively small fraction of the floor space indicated in said prior patent, for example.

Another object of the invention is to provide a machine of the character described including a conveyor having article-treating units relatively rotatably mounted thereon, and means permitting stopping the conveyor for loading and unloading individual article-forming units without necessarily disturbing continuous operation of the other units.

Another object of the invention is to provide apparatus as set forth in the last paragraph, including selectively operable means by which a quick preliminary rotative motion may be given to the units at a loading and unloading station.

Another object of the invention is to provide, as for use in apparatus of the character described, an improved planetary gearing unit by which separate rotatable members driven thereby may be selectively rotated in unison or independently of each other in the same or different directions, and by which one said member may be rotated while the other is stationary.

Another object of the invention is to provide a compact machine of the character described adaptable for carrying out said rotary-casting method as for making hollow rubber articles, including improved means for effectively controlling the capillary movement of water from the latex, continuously outwardly through the mold pores; that is, without interruptions likely to cause formation of air bubbles which result in imperfect articles.

These and other objects of the invention will be manifest from the following brief description and the accompanying drawings.

Of the accompanying drawings:

Figure 1 is a top plan view of dual rotary-casting machines embodying the features of the invention.

Figure 2 is a vertical cross-section, partly broken away, taken substantially on the line 2—2 of Figure 1, through one of the dual rotary-casting machines, and particularly illustrating a rotary-casting wheel or conveyor thereof.

Figure 3 is a vertical cross-section through one of said machines, taken substantially on the line 3—3 of Figure 2, parts in the background being omitted for clarity.

Figure 4 is a fragmentary cross-section, on an enlarged scale, taken substantially on the line 4—4 of Figure 2, and illustrating bearing means for journalling said wheel or conveyor.

Figure 5 is an enlarged fragmentary view, partly broken away and in section, of a portion of the conveyor mechanism at the lower left of Figure 2.

Figure 6 is a top plan view of a conveyor-driving mechanism for one of the dual machines, there being one such mechanism for each unit.

Figure 7 is a vertical cross-section through a planetary gear mechanism, taken substantially on the line 7—7 of Figure 6, this mechanism permitting selective operations of the conveyor wheel either independently or simultaneously with operation of individual mold rotating units thereon.

Figure 8 is a vertical cross-section taken substantially on the line 8—8 of Figure 7.

Figure 9 is a fragmentary vertical cross-section, partly broken away and in section, through one of the rotary-casting units in a position thereof best shown at the bottom of Figure 3.

Figure 10 is a top plan view of the mold stacks on the respective casting units, particularly as viewed at 10—10 in Figure 9.

Figure 11 is a fragmentary bottom plan view of mold rotating mechanism, as viewed substantially on the line 11—11 of Figure 9.

Figure 12 is a vertical cross-section taken substantially on the line 12—12 of Figure 9.

Figure 13 is a vertical cross-section, on an enlarged scale, taken substantially on the line 13—13 of Figure 9.

Figure 14 is a side elevation, on a reduced scale, partly broken away and in section, illustrating a finished hollow rubber article produced in the rotary-casting apparatus.

The rotary-casting machine

Although Figure 1 shows dual rotary-casting machines, it will suffice to describe the invention in connection with one machine 20 thereof, as shown in Figures 2 to 13, the machine 21 being identical thereto in all respects.

Referring particularly to Figures 2, 3, 4, 5 and 6, there is illustrated an open framework 23 in the form of a polygonal wheel, somewhat like a "Ferris Wheel" of well-known type, the same being rotatable about a horizontal axis, and carrying a plurality of twin rotary-casting units A and A₁ operated in unison, substantially as shown and described in said Patent No. 2,469,892. There is one such set of double casting units at each apex of the conveyor wheel defined by adjoining flat sides of the outer periphery thereof (see Figures 2 and 3).

For supporting the wheel 23 to rotate freely on said horizontal axis (see Figures 2, 3 and 4) a fixed structural cross-member 20a of the machine has mounted thereon two sets of three circumferentially spaced rollers 20b each, in rolling engagement in annular seats 23a at opposite ends of a cylindrical hub 23b of the wheel. Flanges 20c on the rollers are engageable with opposite ends of the hub 23b for retaining the wheel against substantial lateral movement with respect to the general plane of rotation thereof.

The rotary-casting units

Referring now to Figures 9 to 13, there is illustrated the details of construction of one such double rotary-casting unit, wherein each single unit A or A₁ is adapted to have removably supported thereon a plurality of stacked plaster of Paris, sectional cavity molds 24. Each unit A and A₁ is operable to apply a compound rotary movement to a stack 24a of molds thereon for forming articles therein by deposition of aqueous dispersion material.

Accordingly, supporting members or arms 25 of each unit A or A₁ have hubs 26 and 27 keyed or otherwise fixed on the opposite ends of a common shaft 28 journalled in spaced, horizontally aligned bearing members 29 and 30 fixedly mounted on the conveyor wheel 23. Shaft 28 is mounted to be selectively rotated in said aligned bearing members by drive means to be described later. As the units A and A₁ are identical, except that they are opposite hand, only the unit A will be described in detail and, therefore, like parts of the opposite hand units will hereinafter be designated by like numerals.

The arm 25 extends from its hub portion 26 at a substantial angle to the axis of the shaft. That is, the angularly extending arm is adapted to swing in a conical path with rotation of the shaft. Journalled in suitable bearing means at the outer end of arm 25 is a spindle 32 which extends freely inwardly toward intersection with the axis of shaft 28, substantially at right angles to said angle of the arm. The molds 24 are circular or disc-shaped and are centrally apertured, as indicated at 33, for free sliding reception of spindle 32 therethrough, a stack 24a of such molds being adapted to be releasably clamped between a plate 34, fixed on the spindle at the inner end thereof adjacent the arm, and a removable clamping plate 35 of a quickly releasable clamping device 36. Spacers 37 of relatively small size are positioned between the adjacent plaster molds of the stack to permit circulation of air for purposes to be described later. For counterbalancing the unit A with the molds stacked thereon, a pair of parallel rods 38 extending from hub 26, in the same general angular direction as spindle 32, have a counterweight 39 slidably adjustable along the same. The weight 39 is adjustable so that the loaded unit will be substantially dynamically balanced for smooth rotative operation thereof, but at the same time so that when the machine is in stopped position the unit will always turn in the position thereof shown in Figure 9, that is, with the spindle extended upwardly and outwardly of the machine, for ease of loading and unloading the molds therefrom. With a stack of five molds as shown, the center thereof will be substantially aligned with the axis of shaft 28 although more or less molds may be readily balanced in the unit by adjustment of the counterweight 39.

Improved means is provided for steady, effective and efficient rotation of spindle 32 about its axis in synchronism with rotation of the unit about the axis of shaft 28, for attaining uniform deposition of article-forming material in the mold cavities. Accordingly, a fabric-reinforced, flexible rubber V-belt 42 is engageable between a tapered annular groove 43 of a relatively fixed sheave 44, formed integral with an outward extension 45 of bearing 29 (or 30), and a tapered annular groove 46 of a sheave 47 rotatably mounted on a stem 48 projecting from the arm 25, at the outwardly presented side thereof opposite to the spindle 32. For guiding or bending the belt 42 to have the opposite looped ends thereof in angularly disposed planes of the fixed and rotatable sheaves 44 and 47, respectively, idler pulleys 49 and 50 are suitably adjustably mounted at opposite sides of arm 25 at the juncture of said two planes. The spindle 32 is adapted to be rotated on its axis, by means of a gear 51 fixed on a reduced extension 52 of the spindle, meshing with a suitable gear 53 concentrically attached to the sheave 47. In other words, if the belt 42 were connected directly to a gear (not shown) on the spindle, the latter would be driven in the same direction as the arm, and the rotative movement of the molds with the spindle would be negatived. A suggested speed reduction between the spindle 32 and shaft 28, is approximately one revolution per minute of arm 25 about the axis of shaft 28, to one and one quarter revolutions per minute of the spindle 32. That is, when the arm 25 is rotated with the shaft 28, rotative action is transmitted to sheave 47 by the belt 42, steadily progressively "walking" around said fixed sheave 44.

The clamping device 36 includes a nut 54 threaded on an externally threaded boss 55, said boss having a central bore through which the spindle 32 is slidably receivable. A handle 56 on nut 54 is operable to turn the same on the threaded boss 55, axially outwardly against a split collar 57 releasably fixed on the spindle, thereby to urge the plate 35 inwardly to apply requisite clamping action to the mold stack against said plate or member 34 attached to the spindle. The split collar 57 has the spindle 32 slidably received through a central aperture thereof, and is releasably clamped in fixed relation to the spindle by operation of a handle 58 suitably mounted and provided with cam or equivalent means to urge opposite sides of the split portion of the collar together. As a safety feature, to prevent accidental removal of the clamping device 36 and molds 24 from the spindle, a freely projecting end portion of spindle 32 is provided with an annular groove 59 for reception of opposed prongs of an elongated U-shaped spring clip 60 somewhat like a hairpin (see Figures 9 and 10).

In order to assure that the latex will reach cavity surfaces adjacent overhanging parts of the mold defining adjoining deeply recessed portions of each article-forming cavity, suitable means, to be described later, is provided for automatically reversing the compound rotative motion applied to the mold stack 24a.

Operation of rotary-casting units

In use of each double rotary-casting unit, described above, loading and unloading of the molds 24 is accomplished while the units A and A1 are in an inoperative or non-rotative position best shown in Figure 9, or the positions of the two lowermost units A and A1 in Figures 2 and 3, and with the safety clip 60 and clamping device 36 removed from spindle 32. For this purpose the clamping device is quickly removable by first moving handle 58 to release the cam pressure thereof on split collar 57, which is then slipped off the end of the spindle. This permits removal of the plate 35 with nut 54 thereon from the spindle. The molds 24 with articles formed therein by a previous mold-rotating cycle, are similarly removable one at a time, and then replaced by molds having predetermined quantities of flowable material, such as latex, in each article-forming cavity thereof, in the same stacked relation. The new stack 24a of molds is clamped against relatively fixed plate 34, by application of plate 35 and collar 57 to the spindle, as shown in Figure 9, turning the handle 58 to clamp the collar fixedly on the spindle, and operating the handle 56 to back the nut 54 on threaded boss 55 against the collar. When the mold stack of unit A or A1, as the case may be, is thus clamped therein the machine is operated, in a manner to be described, to rotate shaft 28, thereby swinging the arms 25 in conical paths of movement thereof and causing the spindles to rotate on the axes of the same.

The resultant simultaneous rotation of the molds about angularly disposed axes in said periodically reversing directions, for approximately forty-five minutes, is effective to deposit the latex bodies on the mold cavity surfaces in accreted layerings, crossing and recrossing in diverse directions of flow of the latex, until all of the latex has been so deposited in the shape of a hollow character animal as shown in Figure 14, for example, of substantially accurately uniform wall thickness. It will be noted that the molds are not only rotated about the axes of shaft 28 and spindle 32, but due to movement of arm 25 in a conical path there is a resultant tilting of the molds above and below a pivot point on the axis of said shaft 28, that is, between the angle of the molds as shown in Figure 6 and an extreme opposite angular position thereof when the arm 25 is in a topmost position of rotation (see Figure 3). Compound rotative movement of the mold stacks about a multiplicity of axes for complete uniform coverage of the mold cavities is further assured by automatic operation of reversing mechanism to be described.

The time required to complete a compound rotational movement of a mold stack of a unit A or A1, to form rubber articles in the molds, may vary according to conditions, such as differences in the characteristics of the deposition material, desired thickness and size of the completed article, etc., but in actual full scale production of rubber toys of one type (see Figure 14) by the present method it has been found that latex deposition to full thickness may be accomplished in approximately forty-five minutes.

Driving mechanism for the double rotary-casting units

In Figures 2, 3, 5, 6, 7 and 9 there is shown driving means for applying the aforementioned compound rotative movement to the mold stacks, including a continuous chain 63, adapted to be driven by a driving sprocket 64 on a planetary gear unit 65, to be described later, said chain being trained around the outermost portions of all of the sprockets 66, relatively of the conveyor wheel 23, coextensively with the outer perimeter of the same, in the manner and in the relationship best shown in Figure 2. Releasable devices 67 and 68 are provided for forming opposite portions of chain 63 in elongated loops 69 and 70 extending oppositely inwardly toward the center of wheel 23, whereby the sprockets 66 will be engaged with the chain portion which is thereby conformed to polygonal perimetrical shape of the wheel, substantially all the way around the same. A free space 72 is provided between the opposite inner ends of the chain loops 69 and 70, wherein the sprockets 66 will be disengaged from chain 63. When the respective pairs of mold rotating units A and A1 are in this space 72 they will be in inoperative non-rotating condition (see Figure 9), with the spindles 32 presented freely upwardly, for loading or unloading the molds 24 as previously described.

The releasable chain-looping device 67 may include an arm 72, pivoted at one end to an upright 73 of a frame 74, and having a sprocket 75 on the free inner end thereof, the loop 69 being formed by extension of the chain 63 from the outer perimetrical portion of the wheel 23, reversing it around the sprocket 75, and training the same around two vertically spaced sprockets 76 and 77 on the frame 74 and an idler sprocket 78 adjacent the planetary gearing unit 65. The arm 72 is releasably urged toward engagement of the upper reach of chain loop 69 with the sprockets 66 of the bottommost double rotary-casting units A—A1, by means of a suitable power-operated extensible arm 79 pivotally connected between the arm 72 and a bracket 80 on frame 73. Extensible arm 79 may include a piston member 81 pivotally attached to arm 72 and reciprocable in an air cylinder 82 pivoted to the bracket 80. Air pressure, from a suitable source, is applicable to the cylinder 82 to hold the upper reach of the chain loop 69 in the path of the casting unit gears 66 as they approach or leave the bottom of the circular path thereof with rotation of the conveyor wheel 23. The opposite hand chain-looping device 70, best shown in Figure 9, is similar to the device 69 in substantially all respects, and hence like parts are given like numbers unless otherwise noted. The chain 63, however, is trained around an idler sprocket 88 on the frame 73 and adjacent the floor level to an idler sprocket at 89, and thence back to the driving gear 64 of the planetary gear unit 65. For adjusting the tension in the chain 63, the sprocket 77 is rotatably mounted on slides 84 and 85 which are horizontally slidably adjustable in guideways 86 at opposite sides of the frame 73, as by means of suitable screws 87, 87.

Thus, assuming that the conveyor wheel 23 is stopped in the position best shown in Figures 2 and 5, and that the mold rotating gears 66 are being driven by chain 63, the two lowermost double rotary-casting units (each including units A and A₁), will be in a position in which the cylinders 82, 82 may be operated to lower the arms 72, 72 to the chain-dotted position of Figure 5, in which the upper reaches of the chain loops 69 and 70 will be disengaged from the two bottommost gears 66, thereby permitting the lowermost double units to assume inoperative upright loading or unloading positions, as previously described with reference to Figure 9. In other words, either one or both of any two lowermost double units may be in an inoperative position for the purposes set forth while all of the other double rotary-casting units continue to have compound rotative movement applied thereto by movement of chain 63. By means of the devices 67 and 68 it is possible to load the molds quickly onto the units A or A₁ in the stopped position just mentioned, with the proper amount of liquid latex contained in the mold cavities, and immediately thereafter to swing the arms upwardly to start rotation of the units.

If necessary or desirable the double units A (or A₁) may be worked upon while in the free space 72, between the looped portions of the chain, in which space said units will be in inoperative or non-rotating condition.

*The conveyor wheel rotating means*

The conveyor wheel 23 is rotatable on the bearing rollers 20b, 20b thereof, by means of a continuous chain 91, adapted to be driven by a wheel-driving sprocket 92 on the planetary gear unit 65 (see Figures 2, 3, 5, 6, 7 and 9). As best illustrated in Figures 2 and 6, the chain 91 extends from said driving gear 92, under an idler sprocket 93 and upwardly substantially tangentially to the circular path of the outer periphery of the conveyor wheel at a point slightly below the horizontal centerline of the wheel, from which point the chain engages the outermost teeth of sprockets 94, 94 relatively fixedly mounted on the fixed bearing members 29 of the dual mold-rotating units A—A₁ on the upper portion of the wheel to a point on the other side of the wheel slightly below said horizontal centerline, from whence the chain extends downwardly and is guided back to the driving sprocket 92 in planetary gear unit 65, by means of suitable idler sprockets 95, 96, and 97. The idler sprocket 95 is slidably adjustable, in the manner of sprocket 77, for adjusting the tension on chain 91.

In order to maintain the chain 91 in desired engaging condition between adjacent sprockets 94, the latter may be adjustably relatively fixedly mounted on the bearing member, by being yieldingly held relatively non-rotatable thereon by a pair of clamping devices for each sprocket, each clamping device including spring-pressed plates 98 and 99 clampingly engaging opposite sides of sprocket 94, and each clamping device being relatively fixedly mounted on a radial arm 100 of wheel 23, as by a flange 101 on one clamping plate 99 bolted to the respective radial arm. The effect is the same as the sprocket being normally non-rotatable with respect to the wheel, which is, therefore, rotated on its axis by movement of the chain in either direction, by the driving gear 92 of the planetary unit 65.

*The planetary driving mechanism*

Because the pairs of chain-driven sprockets 66 and 94, carried by the conveyor wheel 23, are of the same pitch diameters and are on the same axes (the axes of shafts 28), it will be self-evident that if separate driving means were provided to move the chains, in the same direction at the same linear speeds, no rotational movement would be applied to the mold units A—A₁. That is, in the hypothetical example given, articles would not be properly formed in the molds 24, if at all. The same would be true in varying degrees under similar conditions in which the chains were independently moved at varying speeds, although operation of the mold units would no doubt be satisfactory if the mold-rotating chain alone were moved.

The primary purpose of the planetary gear unit 65, therefore, is to overcome this difficulty, and by provision of the same the respective double mold units A—A₁ are each provided with the above-described compound rotative movement about a plurality of axes, uniformly and constantly, regardless of whether the conveyor wheel 23 is stationary or rotating in either direction, or whether the mold units are rotatively operated in forward or reverse directions.

To this end, with particular reference made to Figures 6, 7 and 8, the wheel-driving chain 91 may be engaged over a wheel-rotating sprocket 92 which is keyed on an outward hub extension 103 of a gear 104, within a housing 105 of the planetary mechanism 65, said gear being freely rotatably journalled in a bearing 106 in a plate 107 removably secured to a wall 108 at one side of housing 105, over an access opening 109 therein. The mold-rotating sprocket 64 may be keyed on a free end of shaft 110, which is freely rotatably mounted through the hub 103 of said gear 104, at one side of the housing, the other end of this shaft being journalled in a bearing 111 in the wall 112 opposite to said housing wall 108. Gear 104 is provided with internal and external toothed peripheries 113 and 114, respectively, the latter of which is meshed with a pinion 115 keyed to a shaft 116 journalled on bearings 117 and 118 on said plate 107 and said wall 112, and said shaft 116 having an outward extension coupled at 119 to a drive shaft 120 of a reduction gear device 121 suitably driven by an electric motor 122 (see Figure 6). Thus, at all times while motor 122 is running the chain 91 is moved to rotate the conveyor wheel 23 at desired speed.

The mold-rotating chain 63 is provided with an independently operable power means, including a motor 124 which through a reduction gear 125 drives a shaft 126 journalled between the wall 112 and plate 107 of the housing 105 (see Figures 6 and 7). Driving connection from the shaft 126 to shaft 110 is accomplished through planetary gearing 127 which makes it possible to rotate said shaft 110 at a constant speed, in either direction, whether the wheel-rotating gear 104 is stationary or rotating in either direction.

The planetary gearing 127 includes a driving gear 128 freely rotatable on shaft 110, between gear 104 and an internal gear 129 keyed to said shaft 110, the driving gear 128 being rotatable by a pinion 130 fixed on driven shaft 126 meshing with the externally toothed periphery of said idler gear 128 and said driving gear also having shaft 131 journalled therethrough, at a substantial radius from the longitudinal axis of shaft 110, and said shaft 131 having pinions 132 and 133, keyed on opposite outward extensions thereof, meshing with the internally toothed periphery of gear 129 and with the similar internally toothed periphery 113 of gear 104, respectively. For the present purposes the pitch diameters of the internal gears 113 and 129 may be as nearly the same as possible, but with a greater number of teeth in gear 129 than in gear 113. As an illustration, the pinions 132 and 133 may each have twelve teeth and the internal gears 113 and 129 forty-four and forty-five teeth, respectively.

Assuming a situation in which the wheel-rotating motor 122 is stopped, and gear wheel 104, therefore, is held relatively fixed by pinion 115, continued rotation of shaft 126, through pinion 130, will tend to rotate the idler gear 128 on the shaft 110. As the gear 128 is thus rotated about the axis of shaft 110, the pinions 132 and 133 meshing with internal gears 113 and 129, respectively, are provided with movement on a principle similar to combined rotations in epicyclic trains. Thus, in the example just given, the pinion 132 in turning around the internal gear 113 of wheel 104 will rotate shaft 131 and pinion 133 thereon, the pinion 133 thereby turning freely in the internal gear 129, but because gear 129 has one more tooth than gear 113 each time the pinion 132 makes a complete turn of 360 degrees in its orbit around internal gear 113 the pinion 133, although similarly making a complete turn of 360 degrees, will have failed to make a complete circuit around internal gear 129 by a lag of one tooth. That is to say, if the driving gear 128 makes forty-five turns on its axis there will be a lag of one tooth for each turn which is the number of teeth in internal gear 129, and the resultant will be one turn of gear 129 for each forty-five turns of driving gear 128.

Now, supposing the motor 122 is operated in forward direction to turn pinion 115 and rotate gear wheel 104 the conveyor wheel 23 will be rotated on its axis, as described above, in forward direction. Supposing also, that motor 124 is operated to rotate gear 128 on its axis on shaft 110 in the same direction as gear wheel 104. Under this set of circumstances the pinion 132 idles around the internal gear 113 as before, without effect thereon, but because driving gear 128 is turning at the same rotative speed as before the resultant driving force, from pinion 132 engaging gear 113 to pinion 133 engaging internal gear 129, is the same as before, namely there will be a resultant one revolution of gear 129 for each forty-five revolutions of driving gear 128, due to a lag by one tooth (equivalent to one forty-fifth of a revolution) of the gear 129 for each full turn or circuit of sprocket 133 around its orbit.

If motor 124 is reversed the resultant rotation of internal gear 129 will be as before, namely one revolution in the opposite direction for each forty-five revolutions of driving gear 128, and again this is true whether the conveyor-operating gear-wheel 104 is stationary or rotating in either direction. In other words, regardless of what the condition of the conveyor-operating gear-wheel 104 may be, the mold units A—A₁ are rotated at a predetermined resultant speed with respect to the conveyor 23.

Thus, although with the apparatus as shown the conveyor wheel chain 91 may be moving in one direction, while the mold units A—A₁ are rotating about the axes of shafts 28 (Figure 9) in the opposite direction, the mold-rotating chain 63 will be moving in the same direction as chain 91, but the speed differentials are such that the resultant movement of chain 63 relative to the conveyor imparts said predeterminately uniform resultant rotational movement to the mold units A—A₁. Stated in still another way: when the motor 124 is running at uniform speed in either direction the resultant compound rotative movement applied to each mold stack 24a, relatively of conveyor wheel 23, is constant for all linear speeds of the two driving chains 63 and 91 relatively of each other, regardless of whether the conveyor chain 63 is stationary, or moving in either direction.

For automatically reversing the compound rotative movements of the double mold-rotating units A—A₁, say every five minutes, whether the conveyor wheel 23 is rotating or stationary, the reversing motor 124 may be reversed in known manner, as by switch means 134 periodically operated by a pin or pins 135 on chain 63, thereby to reverse the direction of rotation of gear wheel 129 and the wheel-rotating sprocket 64 keyed thereto. This reversing may be accomplished by other equivalent means, such as by electrical relays or known timing devices. Wheel 23 is reversible by reversing its motor 122.

*Machine housing*

Means is provided for effectively controlling the moisture condition of the stacked molds 24 of the double mold-rotating units A—A₁ of the machine 20 (or 21). Accordingly, the mold-rotating machine 20 (or 21) may be completely enclosed by housings H (see Figures 1 and 2) within which heated air is circulated around the mold stacks 24, and between the porous molds thereof, to maintain the capillary movement of water from the latex in the respective mold cavities continuously outward through the mold pores, at all times while there is either liquid or deposited latex in the molds. A suitable temperature for this air is for the present purposes approximately 90° F. The heated air may be forced into the housing by a motor-driven blower 136, through conduits 137, 137. A door 138 at each side of each housing 20 and 21, provides for access to the mold-rotating units A and A₁ adjacent the spacers 72.

This moderately heated air, then, in circulating around the molds, including the spaces between adjacent molds, all during the pre-drying stage, will maintain the molds relatively dryer on the outside than on the inside (from the cavity surfaces), and as long as there is water in the latex deposits such water will be steadily dissipated outwardly by capillary attraction and evaporation and no wet layers or strata will be created to cause formation of recesses and holes in the articles. When succeeding latex supplies are placed in the molds the molds will again be desirably wetter inside than out and the capillary movement of the water will be maintained continuously or at least consistently outwardly as long as there is water in the latex or latex deposits.

When each article is fully formed, by deposition or accretion of latex within its mold cavity, and is ready for removal from the molds, substantially all water from the initial predetermined quantity of latex will have passed outwardly of the mold cavity by capillary attraction, through a myriad of pores in the mold material, the water being dissipated at the outer mold surfaces by evaporation.

Summary of operation of machine

At the start of a cycle of operation of a machine 20 (or 21), the conveyor wheel 23 is stopped, either with the two lowermost mold units A—A1 positioned as shown in Figure 2, or with one such unit positioned in the spaces between the chain-looping devices 67 and 68. In the first instance the units are released to aforementioned inoperative, non-rotative, condition by operation of pistons 82, to lower arms 72 and thereby disengage the chain loops 69 and 70 from the mold-rotating sprockets 66. In the second instance the unit is automatically disengaged from the chain 63, but in any event the units assume the inoperative position shown in Figure 9.

Upon loading the molds 24 in stacked condition, as shown in Figure 9, with a predetermined quantity of latex in each mold cavity, as previously described, the wheel 23 is progressively rotated to swing successive mold units into position for similarly loading the same through the doors 138 in housing H. If fast setting latex is used each closed mold may have a quick preliminary compound rotative movement applied thereto before it is applied to its stack on a spindle 32. It is desirable to work on two adjacent units A (or A1) at the same time so that molds 24 unloaded from one stack of one unit may be reloaded on the spindle 32 of the other unit. In any event, whether the chain loops 69 and 70 are raised or lowered (see Figure 5) the conveyor 23 is rotatable in either direction to move the sprockets 66 of the reloaded units into driving engagement with the mold-rotating chain 63. In some instances however, it may be desirable to rotate the newly loaded mold units immediately by operating cylinders 82 to engage the chain portions 69 and 70 with the sprockets 66, as previously described. It will be readily seen that in this manner, and by reason of the unique planetary gear mechanism also described, it is possible to load and unload any mold unit A or A1 at station 72 without interrupting the compound rotative movement of the units on the wheel, above station 72. During the major portion of the article-forming process the doors 138 are kept closed to increase the efficiency of the air circulation in housing H.

After the articles have been fully formed and pre-dryed in the mold-rotating machine 20 (or 21), as described above, the stacks are removed therefrom and the individual molds are opened for removal of the articles 139 (see Figure 14). These articles, which may each have a relatively small whistle aperture 140 provided in the wall thereof, either during or after the rotary-casting cycle described above, are then placed on racks and vulcanized in known manner in open heat. The whistle apertures prevent the air within the articles from expanding or contracting to an extent which would cause the same to rupture or to collapse, respectively.

Although the improved apparatus has been described particularly in connection with the production of hollow rubber articles, it may be similarly utilized in the manufacture of hollow articles from other materials which are capable of flowing and drying or setting substantially in the manner described.

Conclusion

It will be seen from the foregoing that the present machine not only makes possible the continuous production of hollow articles of rubber by the above-described rotary-casting method, but also makes possible very large production in a small fraction of the space formerly required for the same or smaller production. Rotation of the large wheel 23 during casting of the articles may be utilized to apply additional variation of the angles of rotation of the mold stacks, if necessary or desirable.

Modifications of the invention may be resorted to without departing from the spirit of the invention or the scope of the appended claims.

What is claimed is:

1. A machine of the character described, comprising a continuous conveyor, power means for moving said conveyor, a plurality of article-working units spaced on said conveyor each including a support carried by the conveyor, a shaft rotatable on said support, an element extending at an angle to the axis of said shaft and rotatable therewith, a supporting member mounted on said element to rotate about an axis angularly of the element and intersecting said shaft axis at an angle thereto, and mounting means for attaching at least one article-working device on said supporting member, and driving means being provided for simultaneously rotating said shaft and member of each said unit, said driving means for each said unit including an annular transmission member rotatable on said element, an annular transmission member relatively fixed on said support concentrically with said shaft axis, a continuous flexible transmission element in driving engagement between said rotatable and relatively fixed transmission members, guide means on said element intermediate said fixed and rotatable transmission members for bending said flexible transmission element to have opposite looped end portions thereof substantially angularly disposed in the planes of said fixed and rotatable transmission members, means connecting said rotatable transmission member for rotating said supporting member, and power means for rotating said shaft and thereby through resulting progressive walking action of said flexible transmission element on said relatively fixed transmission member to rotate said rotatable transmission member.

2. Apparatus as set forth in claim 1, wherein said article-treating members each include at least one porous cavity mold for producing hollow articles by deposition of aqueous dispersion material therein, said machine being enclosed in a housing, and means being provided for circulating air at predetermined temperature within said housing and around said molds, said circulation of air thereby maintaining capillary movement of water from the dispersion material continuously outward through the mold pores at all times while there is dispersion material in the mold cavities.

3. Apparatus as set forth in claim 1, wherein said power means for moving said conveyor and said unit shafts include independently operable driving mechanisms, and transmission means comprising a planetary mechanism including separate input members rotated by the respective power means, separate output members which drive the unit shafts and the conveyor, and combined rotation epicyclic train means between said input and output members.

4. A machine for treating articles, comprising a continuous conveyor, means for moving said conveyor, a plurality of article-treating units movably mounted on said conveyor, in spaced relation, a continuous transmission element, power means for moving said transmission element, and driving members on each said unit engageable by said transmission element to move the units relatively of the conveyor, shiftable guide means for supporting a portion of said transmission element to be movable from and toward the path of movement of said driving members, and means for shifting said guide means from and toward driving engagement of the transmission element with the cooperating driving members.

5. A machine for treating articles, comprising a continuous conveyor, means for moving said conveyor, a plurality of article-treating units movably mounted on said conveyor, in spaced relation, a continuous transmission element, power means for moving said transmission element, and driving members on each said unit engageable by said transmission element to move the units relatively of the conveyor, guide means for diverting a portion of said transmission element away from the path of movement of said driving members along a substantial length of the same defining a working space in which said driving members of units therein are disconnected from said transmission element to discontinue movement of the corresponding units relatively of the conveyor.

6. A machine for treating articles, comprising a continuous conveyor, means for moving said conveyor, a plurality of article-treating units movably mounted on said conveyor, in spaced relation, a continuous transmission element, power means for moving said transmission element, and driving members on each said unit engageable by said transmission element to move the units relatively of the conveyor, guide means for diverting a portion of said transmission element away from the path of movement of said driving members along a substantial length of the same defining a working space in which said driving members of units therein are disconnected from said transmission element to discontinue movement of the corresponding units relatively of the conveyor, said guide means comprising spaced idler wheels maintaining said transmission element in opposed inwardly extending loops, the upper reaches of which are normally engageable with the driving members on the conveyor.

7. A machine for treating articles, comprising a continuous conveyor, means for moving said conveyor, a plurality of article-treating units movably mounted on said conveyor, in spaced relation, a continuous transmission element, power means for moving said transmission element, and driving members on each said unit engageable by said transmission element to move the units relatively of the conveyor, guide means for diverting a portion of said transmission element away from the path of movement of said driving members along a substantial length of the same defining a working space in which said driving members of units therein are disconnected from said transmission element to discontinue movement of the corresponding units relatively of the conveyor, said guide means comprising spaced idler wheels maintaining said transmission element in opposed inwardly extending loops, the upper reaches of which are normally engageable with the driving members on the conveyor, said guide means being movably mounted, means being provided for moving said guide means from and toward said engagement with the driving members.

8. A machine for treating articles, comprising a continuous conveyor including a wheel frame mounted to be rotatable about an axis, power means for rotating said wheel frame, a plurality of article-treating units in perimetrically spaced relation around said frame and mounted to be relatively movable thereon, means for relatively moving each said unit including a shaft rotatable about an axis parallel to the frame axis, shaft-rotating sprockets on said shafts, a continuous chain trained around said frame over the radially outermost portions of said shaft-rotating sprockets, power means for driving said chain to rotate said sprockets and shafts thereof, and means for diverting a portion of said chain away from the path of movement of said sprockets by said wheel frame to provide a portion of the rotative path of said units on said wheel frame in which their movement relative to said wheel frame is discontinued.

9. A machine for treating articles, comprising a continuous conveyor including a wheel frame mounted to be rotatable about an axis, power means for rotating said wheel frame, a plurality of article-treating units in perimetrically spaced relation around said frame and mounted to be relatively movable thereon, means for relatively moving each said unit including a shaft rotatable about an axis parallel to the frame axis, shaft-rotating sprockets on said shafts, a continuous chain trained around said frame over the radially outermost portions of said shaft-rotating sprockets, power means for driving said chain to rotate said sprockets and shafts thereof, guide sprockets engaging said chain to divert a portion thereof out of the path of movement of shaft-rotating sprockets and defining an area in which corresponding driving members are disengaged from the transmission element.

10. A machine for treating articles, comprising a continuous conveyor including a wheel frame mounted to be rotatable about an axis, power means for rotating said wheel frame, a plurality of article-treating units in perimetrically spaced relation around said frame and mounted to be relatively movable thereon, means for relatively moving each said unit including a shaft rotatable about an axis parallel to the frame axis, shaft-rotating sprockets on said shafts, a continuous chain trained around said frame over the radially outermost portions of said shaft-rotating sprockets, power means for driving said chain to rotate said sprockets and shafts thereof, said guide means comprising separate movable guide elements and power means selectively operable for moving the same from and toward driving connection with said driving members.

11. A machine for treating articles, comprising a continuous conveyor including a wheel frame mounted to be rotatable about an axis, a plurality of article-treating units in perimetrically spaced relation around said frame and mounted to be relatively movable thereon, means for relatively moving each said unit including a shaft rotatable about an axis parallel to the frame axis, shaft-rotating sprockets on said shafts, a continuous chain trained around said frame over the radially outermost portions of said shaft-rotating sprockets, power means for driving said chain to rotate said sprockets and shafts thereof, said units each having a toothed member thereon, a second continuous chain engaged over said toothed members around a substantial proportion of the wheel frame, and power means for driving said second chain for rotating said wheel frame.

12. A machine for treating articles comprising a continuous conveyor including a wheel frame mounted to be rotatable about an axis, a plurality of article-treating units in perimetrically spaced relation around said frame and mounted to be relatively movable thereon, means for relatively moving each said unit including a shaft rotatable about an axis parallel to the frame axis, shaft-rotating sprockets on said shafts, a continuous chain trained around said frame over the radially outermost portions of said shaft-rotating sprockets, power means for driving said chain to rotate said sprockets and shafts thereof, said units each having a toothed member thereon, a second continuous chain engaged over said toothed members around a substantial proportion of the wheel frame, and power means for driving said second chain for rotating said wheel frame, said toothed members being sprockets relatively rotatable on said shafts, and slip means being provided for yieldingly non-rotatably fixing said sprockets on said shafts.

13. A machine for treating articles, comprising a continuous conveyor including a wheel frame mounted to be rotatable about an axis, a plurality of article-treating units in perimetrically spaced relation around said frame and mounted to be relatively movable thereon, means for relatively moving each said unit including a shaft rotatable about an axis parallel to the frame axis, shaft-rotating sprockets on said shafts, a continuous chain trained around said frame over the radially outermost portions of said shaft-rotating sprockets, power means for driving said chain to rotate said sprockets and shafts thereof, said units each having a toothed member thereon, a second continuous chain engaged over said toothed members around a substantial proportion of the wheel frame, and power means for driving said second chain for rotating said wheel frame, said power means for driving both said chains including a planetary transmission unit comprising separate rotatable input members and separate rotatable output members, spaced gears rotatable relatively of each other about a common axis and adapted to drive said output members, a wheel intermediate said spaced gears and rotatable about said common axis thereof, separate gears mounted on said wheel to be rotatable together relatively of the wheel at a radius to said common axis and meshing with said spaced gears, the proportions of said meshing spaced and separate gears being such as to provide a difference velocity between the spaced gears, said input members including separate means in relative driving connection with said wheel and in relative driving connection with one of said spaced gears.

14. A machine of the character described comprising a rotatable wheel frame, means for rotating said wheel frame, a plurality of article working units spaced circumferentially around the wheel frame adjacent its perimeter, each said unit including a support carried by the wheel frame, a shaft rotatable on said support and extending transversely of the wheel frame, an element secured to said shaft and extending at an acute angle to the axis of said shaft and rotatable therewith, an elongated supporting member rotatably mounted on said element to rotate about an axis at an angle to the element and intersecting said shaft axis at an acute angle thereto, mounting means for attaching at least one article-working device to said supporting member and driving means for simultaneously rotating said shaft and said member of each said unit.

15. A machine of the character described comprising a rotatable wheel frame, means for rotating said wheel frame, a plurality of article working units spaced circumferentially around the wheel frame adjacent its perimeter, each said unit including a support carried by the wheel frame, a shaft rotatable on said support and extending transversely of the wheel frame, an element secured to said shaft and extending at an acute angle to the axis of said shaft and rotatable therewith, an elongated supporting member rotatably mounted on said element to rotate about an axis at an angle to the element and intersecting said shaft axis at an acute angle thereto, mounting means for attaching at least one article working device on said supporting member, and driving means for simultaneously rotating said shaft and said member of each said unit, said driving means including toothed members fixed on the shafts of said units, a continuous chain engaging a plurality of said toothed members, and power means for driving said chain to rotate said shafts.

16. A machine for treating articles, comprising a wheel frame mounted to rotate about an axis, a plurality of rotatable shafts extending transversely of said wheel frame at circumferentially spaced points adjacent its perimeter, sprockets on said shafts, article-treating units secured to said shafts for rotation relative to said wheel frame by said shafts, a continuous wheel frame driving chain engaging said wheel frame adjacent its periphery, a continuous shaft driving chain engaging said shaft sprockets, separate power means for driving said respective chains, and a transmission unit connecting said power means to said chains comprising separate input members respectively driven by said separate power means, separate output members connected to drive said respective chains, and an epicyclic gear train connected between said respective input and output members.

17. A machine for treating articles comprising a wheel frame mounted to rotate about an axis, a plurality of rotatable shafts extending transversely of said wheel frame at circumferentially spaced points adjacent its perimeter, sprockets on said shafts, article-treating units secured to said shafts for rotation relative to said wheel frame by said shafts, a continuous wheel frame driving chain engaging said wheel frame adjacent its periphery, a continuous shaft driving chain engaging said shaft sprockets, power means for driving said chains comprising a planetary transmission unit including spaced gears rotatable about a common axis and having different numbers of teeth, means respectively connecting said gears to drive said wheel frame driving chain and said shaft driving chain, a rotary element rotatable on said common gear axis, connected gears journalled eccentrically of said rotary element and respectively meshing with said spaced gears, a power driving means operatively connected to one of said spaced gears, and a separate power driving means operatively connected to said rotary element.

18. A machine for treating articles comprising a wheel frame mounted to rotate on a horizontal axis, power means for rotating said wheel frame, a plurality of article treating units disposed in circumferentially spaced relation adjacent the perimeter of said wheel frame, means for rotating each of said units relative to said wheel frame including a shaft carrying each unit and rotatable about an axis parallel to the wheel frame axis, a sprocket on each such shaft and a chain extending around the wheel frame and engaging the sprockets on the shafts of the several units, means for driving said chain to rotate said shafts, and means for diverting a portion of said chain away from the path of movement of said sprockets by said wheel frame adjacent the lower portion of said wheel frame whereby movement of said units relative to said wheel frame is discontinued to permit loading and unloading of said units adjacent the lower portion of said wheel frame.

DIETRICH G. REMPEL.

REFERENCES CITED

The following references are of record in the file of this patent:

UNITED STATES PATENTS

| Number | Name | Date |
| --- | --- | --- |
| 803,799 | Voelke | Nov. 7, 1905 |
| 1,341,670 | Powell | June 1, 1920 |
| 1,812,242 | Jensen | June 20, 1931 |
| 1,998,897 | Kay | Apr. 23, 1935 |
| 2,309,559 | Wemp | Jan. 26, 1943 |

FOREIGN PATENTS

| Number | Country | Date |
| --- | --- | --- |
| 347,014 | Great Britain | Apr. 23, 1931 |